United States Patent
Ogura

(10) Patent No.: US 6,781,113 B2
(45) Date of Patent: Aug. 24, 2004

(54) FIBER BRAGG GRATING STRAIN SENSOR WITH ARC CONFIGURATION

(75) Inventor: Shigeki Ogura, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 27 days.

(21) Appl. No.: 10/035,163

(22) Filed: Jan. 4, 2002

(65) Prior Publication Data

US 2002/0117608 A1 Aug. 29, 2002

(30) Foreign Application Priority Data

Feb. 26, 2001 (JP) .................................. 2001/050134

(51) Int. Cl.[7] .............................................. G01J 1/04
(52) U.S. Cl. ............................. 250/227.14; 250/227.16; 356/32
(58) Field of Search ..................... 250/227.19, 227.11, 250/227.16, 227.15, 227.24, 231.1; 340/555.7; 356/32, 34, 35

(56) References Cited

U.S. PATENT DOCUMENTS

| | | | | |
|---|---|---|---|---|
| 4,401,363 A | * | 8/1983 | Barlow | 350/96.3 |
| 4,734,577 A | * | 3/1988 | Szuchy | 250/227 |
| 5,061,032 A | * | 10/1991 | Meltz et al. | 385/37 |
| 5,726,744 A | * | 3/1998 | Ferdinand et al. | 356/32 |
| 5,787,213 A | * | 7/1998 | Brownlow | 385/37 |
| 5,841,920 A | * | 11/1998 | Lemaire et al. | 385/37 |
| 5,877,426 A | * | 3/1999 | Hay et al. | 73/733 |
| 6,125,216 A | * | 9/2000 | Haran et al. | 385/12 |
| 6,192,176 B1 | * | 2/2001 | Cassarly et al. | 385/32 |
| 6,452,667 B1 | * | 9/2002 | Fernald et al. | 356/73.1 |
| 6,586,722 B1 | * | 7/2003 | Kenny et al. | 250/227.16 |

FOREIGN PATENT DOCUMENTS

| | | | |
|---|---|---|---|
| GB | 0357253 | * | 8/1989 |
| JP | 2000-97786 | | 4/2000 |
| JP | 2000097786 A | * | 4/2000 |

* cited by examiner

Primary Examiner—Diego Gutierrez
Assistant Examiner—Tania C. Courson
(74) Attorney, Agent, or Firm—Wenderoth, Lind & Ponack, L.L.P.

(57) ABSTRACT

A strain sensor has a fiber Bragg grating fastened in a one-quarter circular arc to the strain sensing section of a strain sensor member. One end of the fiber Bragg grating is aligned in the longitudinal direction of the strain sensing section, while the other end is aligned at a right angle to the longitudinal direction. When longitudinal stress is applied, the fiber Bragg grating is elongated at one end and compressed at the other end, creating a high degree of chirp, thereby enabling strain to be measured with high sensitivity. The sensitivity is determined partly by Poisson's ratio, and thus is not limited by geometrical constraints on the strain sensing section.

12 Claims, 9 Drawing Sheets

FIBER BRAGG GRATING STRAIN SENSOR WITH ARC CONFIGURATION

BACKGROUND OF THE INVENTION

1. Field of the Invention

The present invention relates to a strain sensor using a fiber Bragg grating to sense tension or compression.

2. Description of the Related Art

A fiber Bragg grating (FBG) is a type of Bragg diffraction element comprising an optical fiber with a core having a periodically varying refractive index, so that regions having a high refractive index $N_H$ alternate with regions having a low refractive index $N_L$ along the fiber axis. Light propagating through the fiber is reflected back if its wavelength is equal, or approximately equal, to the Bragg wavelength $\lambda_B$ which is expressed as follows in terms of the effective refractive index $n_e$ of the core and the grating pitch d (the distance between successive regions with the same refractive index).

$$\lambda_B = 2 n_e d \qquad (1)$$

An FBG may have a uniform grating pitch, or it may be chirped. In a chirped FBG, the grating pitch d varies, either continuously or in stages, along the length of the fiber. The transmission and reflection characteristics of an FBG depend on the presence or absence of chirp and on such grating parameters as the grating count (the number of alternating regions) and the degree of modulation of the refractive index (the difference $\Delta n$ between $N_H$ and $N_L$). For example, the maximum reflectivity of an FBG increases with $\Delta n$; for a given grating pitch d, the maximum reflectivity increases with the grating count; for a given grating count, the width of the reflection band increases with increasing chirp.

If an FBG is subjected to variations in temperature or strain, the effective refractive index $n_e$ and the grating pitch d in equation (1) change, altering the Bragg wavelength. An FBG can therefore be used as a strain sensor or a temperature sensor, by detecting the Bragg wavelength.

Strain sensors are useful in what is termed smart structure technology, in which sensors are built into buildings, bridges and other structures to sense changes in strain over time at various points. Since an FBG is sensitive to both strain and temperature, for use as a strain sensor, it must be temperature-compensated. One general method of temperature compensation that is being studied employs chirp to create a temperature-independent reflection band.

Japanese Unexamined Patent Publication No. 2000-97786 discloses several strain sensors employing this general type of temperature compensation. One of these conventional strain sensors will be described in detail here for comparison with an embodiment of the present invention to be described later. The conventional strain sensor described here, shown in a top plan view in FIG. 1 and in a side view in FIG. 2, has an optical fiber 10 with an FBG 12 attached by an adhesive, for example, to a tension member 44. The tension member 44 has the general form of a rectangular plate with a tapered section 44a at or near the center where the FBG 12 is located. The axis α of the optical fiber 10 extends longitudinally through the tapered section 44a. If longitudinal tension stress is applied to the tension member 44, then the tapered section 44a elongates by an amount that increases with decreasing width of the taper. The FBG 12 elongates in a similar manner. As a result, the grating pitch of the FBG 12 increases toward the narrow end of the tapered section 44a, changing the FBG 12 from a uniform grating to a chirped grating.

FIG. 3 shows how the reflection band of the FBG 12 changes in response to strain. The horizontal axis indicates wavelength; the vertical axis indicates the relative optical power of the reflected light. Reflection spectrum 62, which has a reflection band 64, is observed before a certain tension force is applied; reflection spectrum 66, which has a wider reflection band 68, is observed after the tension force is applied. The amount of strain caused by the tension can be determined from the width of the band from $\lambda_{min}$ to $\lambda_{max}$ in which the reflected optical power is equal to or greater than a certain quantity. The change in this bandwidth is independent of temperature, so measurement of this bandwidth, or of the change therein, provides a way to measure strain without interference from temperature effects.

The strain $\epsilon_{max}$ in the narrowest part of the tapered section 44a (the maximum strain), the strain $\epsilon_{min}$ in the widest part of the tapered section 44a (the minimum strain), the tension force F, the minimum cross-sectional area $A_S$ of the tapered section 44a, the maximum cross-sectional area $A_L$ of the tapered section 44a, and Young's modulus E are related by the following equations (2) and (3).

$$\epsilon_{max} = F/(E \cdot A_S) \qquad (2)$$

$$\epsilon_{min} = F/(E \cdot A_L) \qquad (3)$$

FIG. 4 plots the changes in $\epsilon_{max}$ and $\epsilon_{min}$, shown on the vertical axis, as functions of the applied tension force F, shown on the horizontal axis. As the force F increases from $F_1$ to $F_2$, the maximum strain $\epsilon_{max}$ and minimum strain $\epsilon_{min}$ both increase proportionally. As implied by equations (2) and (3), however, the slope of the $\epsilon_{max}$ characteristic 52 is greater than the slope of the $\epsilon_{min}$ characteristic 54.

The grating pitch $d_{min}$ in the widest part of the tapered section 44a (the minimum grating pitch) and the grating pitch $d_{max}$ in the narrowest part of the tapered section 44a (the maximum grating pitch) are related to the grating pitch $d_0$ when there is no strain by the following equations (4) and (5).

$$d_{max} = (1 + \epsilon_{max}) d_0 \qquad (4)$$

$$d_{min} = (1 + \epsilon_{min}) d_0 \qquad (5)$$

FIG. 5 plots the grating pitch d, shown on the vertical axis, as a function of longitudinal coordinates on the tension plate 44, shown on the horizontal axis. The solid curve 56 indicates the grating pitch d when a comparatively large tension force (e.g., $F_2$) is applied; the dash-dot curve 58 indicates the grating pitch d when a smaller tension force (e.g., $F_1$) is applied. The coordinates $x_1$ and $x_2$ in FIG. 5 correspond to the positions of the two ends of the FBG 12 in the optical fiber 10. The tapered section 44a of the tension plate 44 is widest at position $x_1$, where the minimum grating pitch $d_{min}$ occurs, and narrowest at position $x_2$, where the maximum grating pitch $d_{max}$ occurs.

When a tension force F is applied, the resulting elongation of the FBG 12 varies continuously from one end $x_1$ and to another end $x_2$ of the FBG 12, increasing from the widest end to the narrowest end of the tapered section 44a. The grating pitch d therefore varies continuously, as shown by curve 56 in FIG. 5. As the tension force F increases from $F_1$ to $F_2$ in FIG. 4, the maximum strain $\epsilon_{max}$ and minimum strain $\epsilon_{min}$ in the tapered section 44a both increase proportionally, and the maximum grating pitch $d_{max}$ and minimum grating pitch $d_{min}$ increase according to equations (4) and (5), causing the upward shift from curve 58 to curve 56 in FIG. 5. The difference between the maximum grating pitch $d_{max}$ and the minimum grating pitch $d_{min}$ determines the total chirp, and also determines the rate of change in the grating pitch d in the longitudinal direction.

The change Δλ in the reflection bandwidth can be understood in terms of the Bragg wavelength $\lambda_{max}$ at the end of the FBG 12 with maximum strain and the Bragg wavelength $\lambda_{min}$ in at the end of the FBG 12 with minimum strain. From the formula for the Bragg wavelength, these Bragg wavelengths are given by the following equations (6) and (7).

$$\lambda_{max}=2n_e\cdot(1+\epsilon_{max})d_0 \quad (6)$$

$$\lambda_{min}=2n_e\cdot(1+\epsilon_{min})d_0 \quad (7)$$

Since characteristic 52 in FIG. 4 has a greater slope than characteristic 54, when tension force is applied, the Bragg wavelength $\lambda_{max}$ at the end of the FBG 12 with maximum strain, corresponding to the maximum grating pitch $d_{max}$, increases more than the Bragg wavelength $\lambda_{min}$ at the end of the FBG 12 with minimum strain, corresponding to the minimum grating pitch $d_{min}$. As the tension force F increases, the difference between $\lambda_{max}$ and $\lambda_{min}$ therefore widens, causing an increasing change Δλ in the reflection bandwidth.

From these results, the reflection bandwidth, or more precisely, the change Δλ in the reflection bandwidth relative to the unstressed state, can be plotted against tension force F as in FIG. 6; as the tension force F increases from $F_1$ to $F_2$, Δλ increases proportionally; strain is measured by measuring Δλ.

The size of the change Δλ in the reflection bandwidth in relation to the change in tension force F determines the sensitivity of the measurement. That is, the sensitivity can be expressed as the slope of the line in FIG. 6, or as Δλ/ΔF.

The sensitivity is affected by the ratio of the maximum cross-sectional area $A_L$ to the minimum cross-sectional area $A_S$ in the tapered section. That is, the sensitivity of the sensor is determined by the geometry of the taper. The sensitivity of this type of sensor is therefore limited by practical constraints on the taper geometry. From the standpoint of engineering design as well as sensitivity, it is undesirable for the performance of the sensor to be restricted by geometrical constraints.

SUMMARY OF THE INVENTION

An object of the present invention is to provide a strain sensor with improved sensitivity.

Another object of the invention is to provide a strain sensor with a sensitivity that is not limited by geometrical constraints.

The invention provides a fiber Bragg grating strain sensor including a strain sensor member having a strain sensing section for receiving stress in a longitudinal direction. An FBG is fastened to the strain sensor member within the strain sensing section. At one end, the FBG is oriented in the longitudinal direction of the strain sensing section. At the other end, the FBG is oriented at a right angle to the longitudinal direction. Between these two ends, the FBG describes one quarter of a circular arc.

When longitudinal stress is applied to the strain sensing section, the FBG is elongated at one end and compressed at the other end. The combination of compression and elongation increases the amount of chirp created within the FBG, thereby enhancing the sensitivity with which strain can be measured. The sensitivity depends not only on the shape of the strain sensing section but also on the dynamic properties (Poisson's ratio) of the material from which the strain sensing section is made. The sensitivity of the strain measurement can thus be improved through selection of a material with desired dynamics, which are not subject to geometrical constraints.

DETAILED DESCRIPTION OF THE INVENTION

Figure 1:
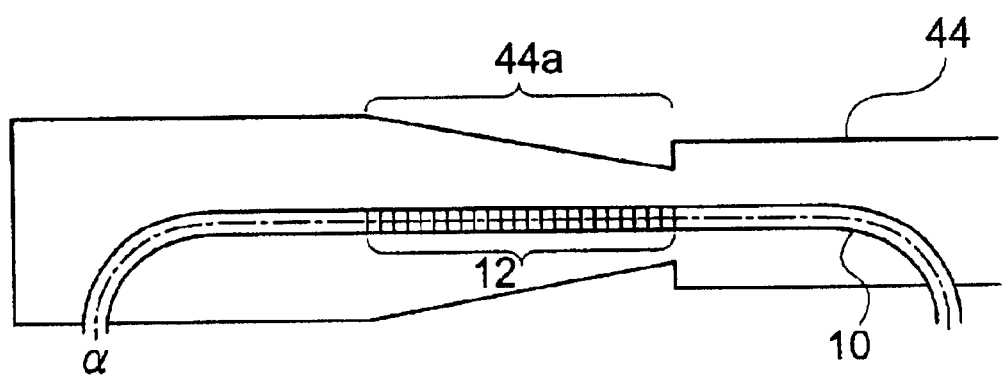
FIG. 1 is a plan view of a conventional strain sensor.

Embodiments of the invention will be described with reference to the attached drawings, in which like parts are indicated by like reference characters. The drawings are explanatory rather than precise; the dimensions, shapes, and positional relationships shown in them are only approximate.

Figure 7:
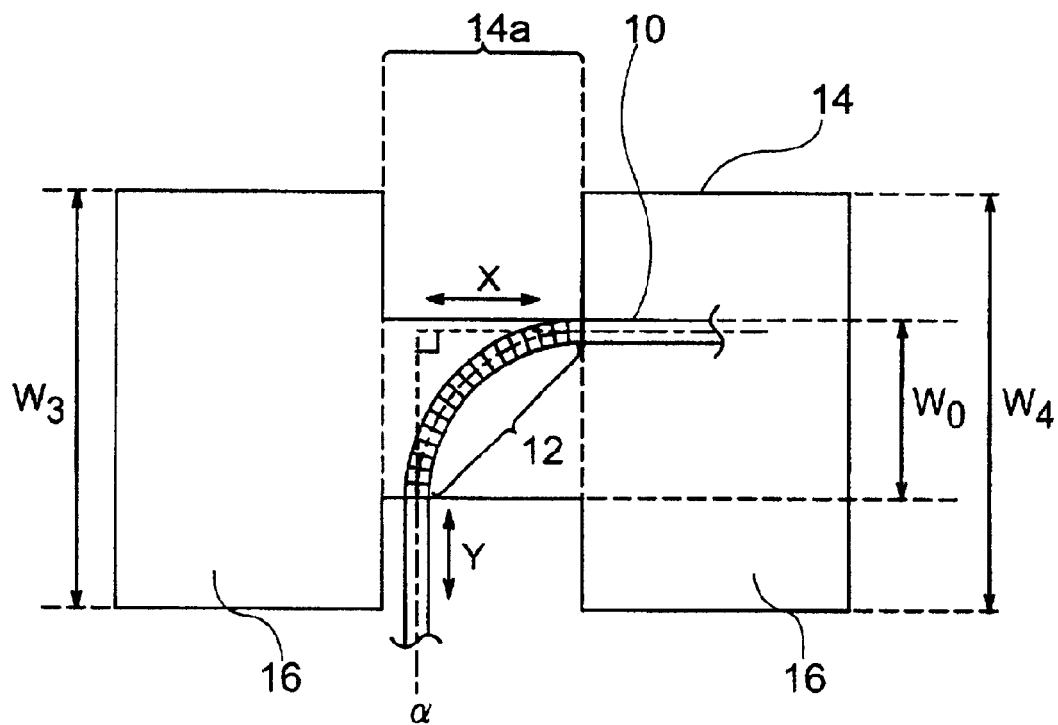
FIG. 7 is a plan view of a strain sensor embodying the present invention.
Figure 8:
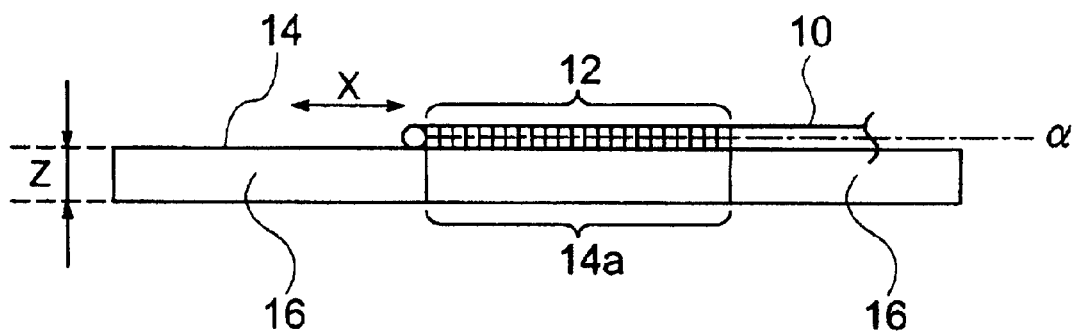
FIG. 8 is a side view of the strain sensor in FIG. 7.

The first embodiment is shown in a top plan view in FIG. 7, and in a side elevation view in FIG. 8.

The FBG strain sensor in this first embodiment comprises a strain sensor member 14 having a centrally located strain sensing section 14a, an optical fiber 10 fastened to the surface of the strain sensing section 14a by an adhesive or the like, and an FBG 12 with an initially uniform grating pitch, formed in the segment of the optical fiber 10 attached to the strain sensing section 14a, and extending along the core axis a of the optical fiber 10. This segment of the optical fiber 10 is bent so that the core axis a describes one quarter of a circular arc. The two ends of the FBG 12 are thus oriented at right angles to one another, one end being aligned in the longitudinal direction or X direction, the other end being aligned in the lateral direction or Y direction, perpendicular to the X direction.

The parts of the optical fiber 10 other than the segment including the FBG 12 may be secured or supported in any convenient way.

As shown in FIG. 8, the strain sensor member 14 is a flat plate with a constant thickness (z). As shown in FIG. 7, the part of this plate forming the strain sensing section 14a has a constant width $w_0$ in the lateral direction. The two ends of the strain sensing section 14a join a pair of stress-transmitting appendages 16, which form the outer parts of the strain sensor member 14. The two stress-transmitting appendages 16 have respective widths $W_3$ and $W_4$, both greater than the width $w_0$ of the strain sensing section 14a ($w_0 < W_3$ and $w_0 < W_4$). The overall shape of the strain sensing section 14a and the two stress-transmitting appendages 16 resembles the letter H. The H shape is desirable in that when a tension force is applied between the two stress-transmitting appendages 16, most of the resulting strain occurs in the strain sensing section 14a, and not in the stress-transmitting appendages 16 themselves.

When such a longitudinal tension force F is applied, the strain sensing section 14a displays strain in both the X and Y directions, becoming elongated in the X direction and compressed in the Y direction. At the end of the FBG 12 aligned in the X direction, accordingly, the optical fiber 10 is elongated in the direction of the core axis α and the grating pitch of the FBG 12 is increased. At the end of the FBG 12 aligned in the Y direction, the optical fiber 10 is compressed in the core axis direction and the grating pitch is decreased. The grating pitch varies continuously between these two ends of the FBG 12, which thus changes from a uniform to a chirped grating. Specifically, the grating pitch increases along the arc from one end of the FBG 12 to the other, as the core axis α becomes increasingly aligned in the X direction.

Figure 9:
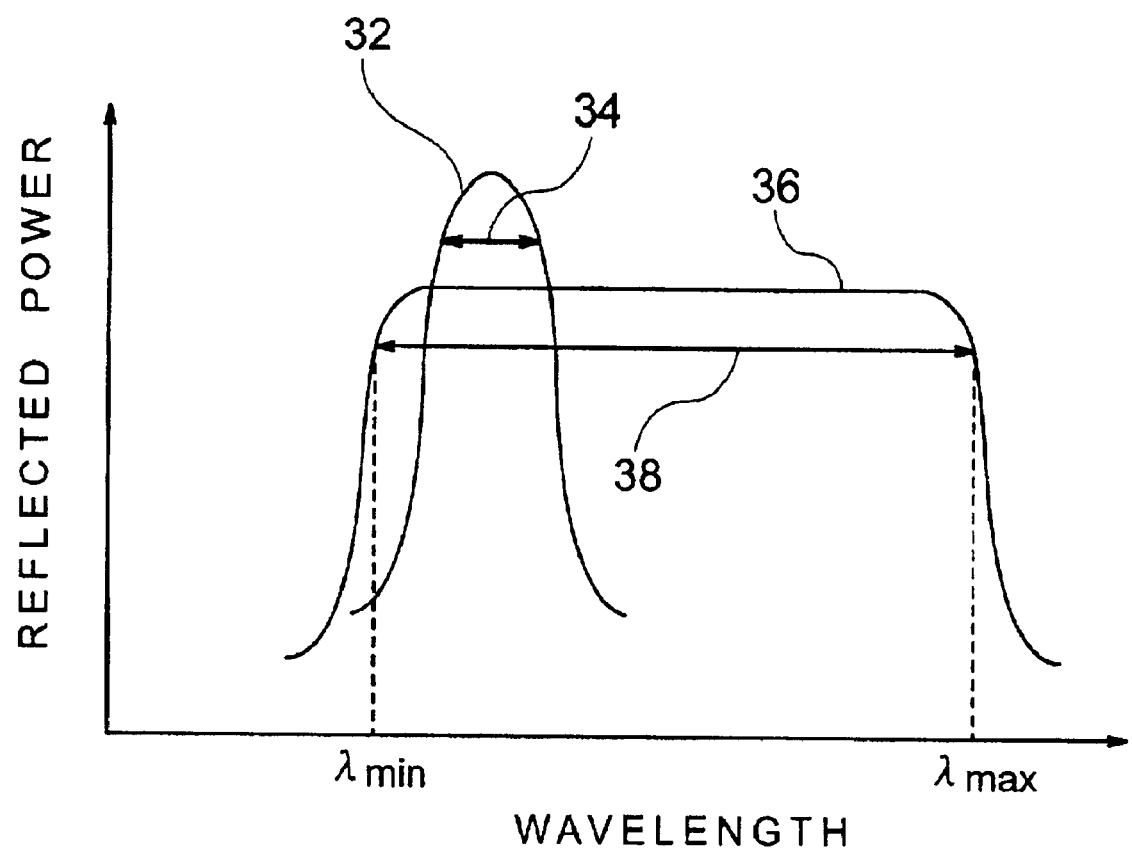
FIG. 9 is a graph illustrating reflection spectra obtained with the strain sensor in FIG. 7.

FIG. 9 shows reflection spectra of the FBG 12 as measured by conventional known methods before and after a certain tension force is applied. Wavelength is indicated on the horizontal axis and reflected optical power on the vertical axis. Reflection spectrum 32, which has a relatively narrow reflection band 34, is obtained before the tension force is applied. Reflection spectrum 36, which has a wider reflection band 38, is obtained after the tension force is applied. It can be seen that the strain caused by the tension force increases the reflection bandwidth of the FBG 12. This is because the strain increases the chirp of the FBG 12. The amount of tension force or strain can be determined by measuring the width of the wavelength band, from $\lambda_{min}$ to $\lambda_{max}$ in which the power of the reflected light is equal to or greater than a certain quantity. The change in this bandwidth is independent of temperature, so strain can be measured without interference from temperature effects.

The longitudinal strain $\epsilon_n$ in the strain sensing section 14a (the strain in the X direction) depends on the tension force F, the cross-sectional area A of the strain sensing section 14a, and Young's modulus E as in equation (8) below.

$$\epsilon_n = F/(E \cdot A) \tag{8}$$

The lateral strain $\epsilon_s$ in the strain sensing section 14a (the strain in the Y direction) is related to the longitudinal strain $\epsilon_n$ by Poisson's ratio ν as in equation (9) below.

$$\epsilon_s = -\epsilon_n \cdot \nu \tag{9}$$

Figure 10:
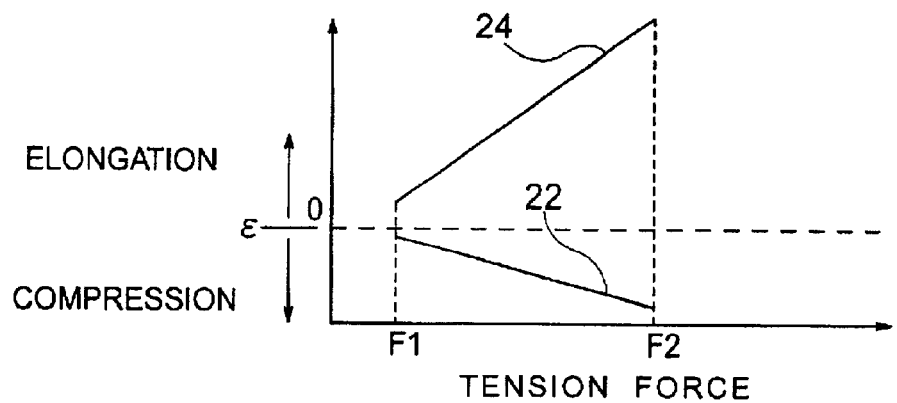
FIG. 10 is a graph illustrating compression and elongation strain in the strain sensor in FIG. 7.

The graph in FIG. 10 indicates both longitudinal and lateral strain as a function of tension force. Strain ε is shown on the vertical axis and tension force F on the horizontal axis. Elongation strain in the X direction is shown as a positive quantity and compression strain in the Y direction as a negative quantity, as indicated by the negative sign in equation (9). The amount of compression strain increases as the algebraic value of ε decreases; that is, as ε moves farther below zero on the vertical axis. As indicated by line 22, compressive strain $\epsilon_s$ in the Y direction increases as the tension force increases from $F_1$ to $F_2$. As indicated by line 24, elongation strain $\epsilon_n$ in the X direction also increases with increasing tension force.

The grating pitch $d_{max}$ in the most elongated part of the FBG 12 (the maximum grating pitch) and the grating pitch $d_{min}$ in the most compressed part of the FBG 12 (the minimum grating pitch) are related to the grating pitch do when there is no strain by the following equations (10) and (11).

$$d_{max} = (1+\epsilon_n)d_0 \tag{10}$$

$$d_{min} = (1-\epsilon_n \cdot \nu)d_0 \tag{11}$$

Figure 11:
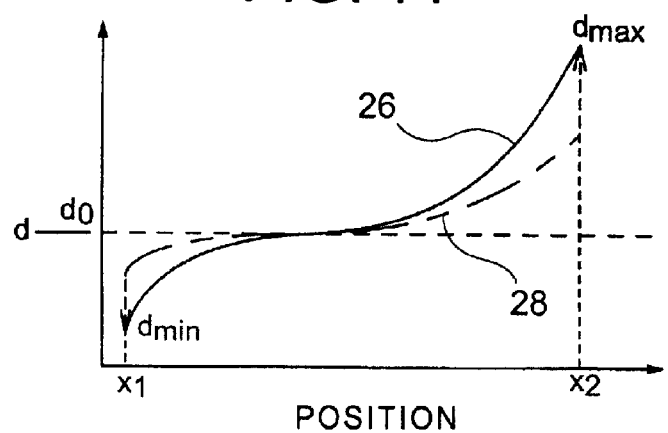
FIG. 11 is a graph illustrating variations in the grating pitch in the strain sensor in FIG. 7.

The grating pitch d varies between $d_{max}$ and $d_{min}$ along the axis of the FBG 12 as shown in FIG. 11. The coordinates $x_1$ and $x_2$ in FIG. 11 correspond to the two ends of the FBG 12 in the optical fiber 10. The first end $x_1$ is the end at which the core axis α of the optical fiber 10 is oriented in the Y direction, at the lower edge of the strain sensing section 14a in FIG. 7. The second end $x_2$ is the end at which the core axis α of the optical fiber 10 is oriented in the X direction, at the right edge of the strain sensing section 14a in FIG. 7. The grating pitch d is indicated on the vertical axis in FIG. 11, the minimum grating pitch $d_{min}$ occurring at the first end $x_1$ and the maximum grating pitch $d_{max}$ occurring at the second end $x_2$. The solid characteristic 26 is obtained when a comparatively large tension force is applied; the dash-dot characteristic 28 is obtained when a smaller tension force is applied.

When a tension force F is applied, the resulting strain in the optical fiber 10 varies continuously from the end of the FBG 12 at which the core axis α is aligned in the Y direction to the end of the FBG 12 at which the core axis α is aligned in the X direction; that is, from $x_1$ to $x_2$ in FIG. 11. The FBG 12 assumes a chirped grating configuration, with the amount of chirp, and the rate of change in the grating pitch in the fiber axial direction, determined by the difference between $d_{max}$ and $d_{min}$.

The reflection bandwidth is basically the difference between the Bragg wavelength $\lambda_{max}$ at the end of the FBG 12 where maximum elongation strain occurs, and the Bragg wavelength $\lambda_{min}$ at the end where maximum compressive strain occurs. Changes in the reflection bandwidth correspond to changes in these wavelengths $\lambda_{max}$ and $\lambda_{min}$, which are expressed by the following equations (12) and (13).

$$\lambda_{max} = 2n_e \cdot (1+\epsilon_n)d_0 \tag{12}$$

$$\lambda_{min} = 2n_e \cdot (1-\epsilon_n \cdot \nu)d_0 \tag{13}$$

Figure 12:
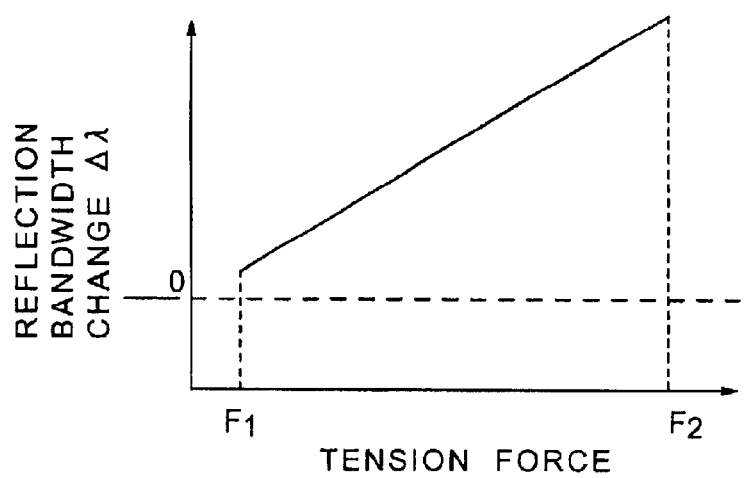
FIG. 12 is a graph illustrating the relation of reflection bandwidth to tension force in the strain sensor in FIG. 7.

As shown in FIG. 10, as the tension force F increases, the amount of strain increases in both the X direction (elongation strain $\epsilon_n$) and Y direction (compression strain $\epsilon_s$) causing $d_{max}$ to increase in equation (10) and $d_{min}$ to decrease in equation (11). The difference between $\lambda_{max}$ and $\lambda_{min}$ in equations (12) and (13) therefore increases, producing an increasing change Δλ in the reflection bandwidth relative to the bandwidth when no tension force is applied. The change Δλ in the reflection bandwidth is plotted on the vertical axis and the tension force F on the horizontal axis in FIG. 12, showing that Δλ is proportional to F. Strain, which is also proportional to F, is measured by measuring ΔX.

The amount of change $\Delta\lambda$ in reflection bandwidth in relation to the amount of change $\Delta F$ in tension force F determines the sensitivity of the measurement. That is, the sensitivity can be expressed as the slope of the line in FIG. 12, or as $\Delta\lambda/\Delta F$. The sensitivity is determined in part by the dimensions of the strain sensing section 14a of the strain sensor member 14, and in part by the amount of lateral compression strain produced by a given amount of longitudinal elongation strain, as expressed by the quantity $\nu$ (Poisson's ratio) in equation (9). This quantity $\nu$ depends on the dynamics of the material from which the strain sensing section 14a is made.

In one example of the first embodiment, the strain sensor member 14 is a stainless steel plate with a constant thickness z of one hundred micrometers (z=100 vm), and Poisson's ratio $\nu$ is 0.293. The width $w_0$ of the strain sensing section is thirty millimeters ($w_0$=30 mm). When strain is absent, the FBG 12 has a Bragg wavelength of 1.55 $\mu$m, and the half-power width of the reflection bandwidth is 0.2 $\mu$m. This example of the first embodiment was evaluated by measuring strain over a range of tension force F from one to twenty kilograms (1–20 kg), and comparing the sensitivity of the measurement with the sensitivity of the conventional strain sensor shown in FIGS. 1 and 2. The tension member 44 in the conventional strain sensor was a stainless steel plate one hundred micrometers (100 $\mu$m) thick, the width of the tapered section 44a varying from a maximum ten millimeters (10 mm) to a minimum five millimeters (5 mm). Other measurement conditions for the conventional strain sensor were the same as in the first embodiment. The length of the strain sensing section 14a in the X direction in the first embodiment and the length of the tapered section 44a in the conventional strain sensor were both kept to ten millimeters (10 mm) or less.

When strain measurements were performed under these conditions, the sensitivity of the first embodiment exceeded the sensitivity of the conventional strain sensor by a factor of approximately 2.5.

In the conventional strain sensor, in which sensitivity is determined by the geometry of the tapered section 44a, the sensitivity is limited by the ratio of the cross-sectional areas at the two ends of the tapered section and cannot be easily improved beyond a certain point. In the first embodiment, however, since the FBG 12 follows an arc, the sensitivity depends in part on Poisson's ratio, which is not limited by the sensor geometry, and in addition, the sensitivity is increased by the compression strain occurring at one end of the FBG 12. For both of these reasons, the first embodiment thus enables a higher sensitivity to be achieved than in the conventional strain sensor.

The taper feature of the conventional strain sensor in FIG. 1 can also be combined into the present invention, as in the second embodiment, described below.

Figure 13:
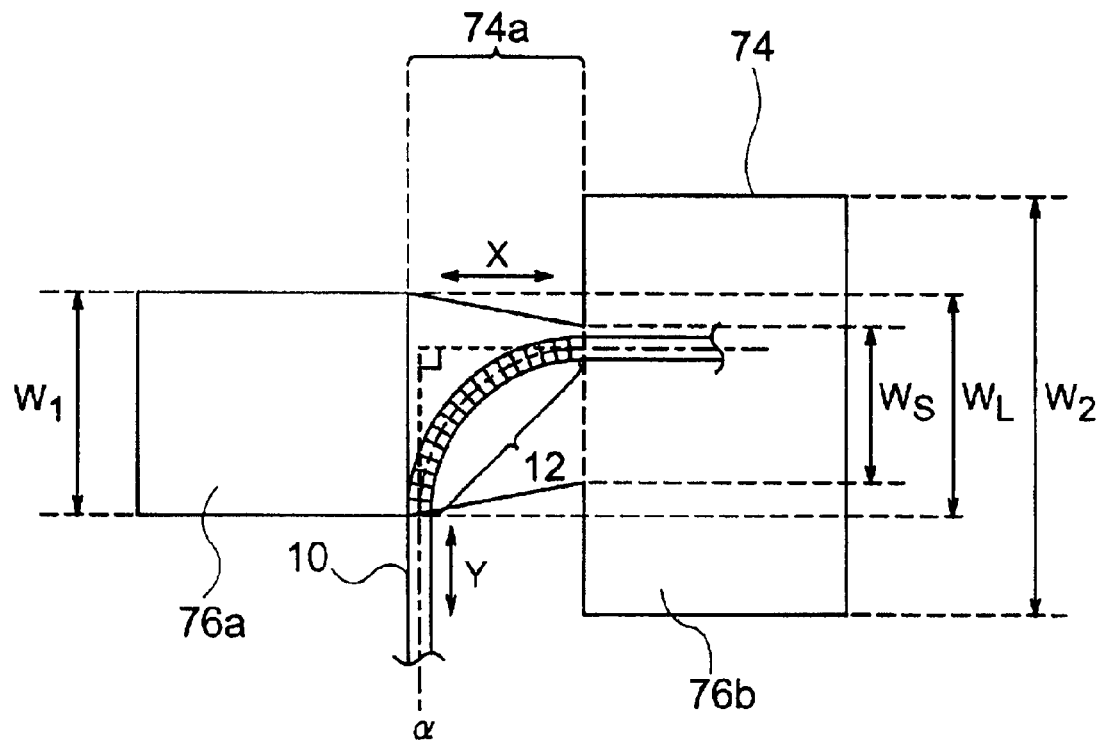
FIG. 13 is a plan view of another strain sensor embodying the present invention.

Referring to FIG. 13, the second embodiment has a strain sensor member 74 comprising a tapered strain sensing section 74a joined to a pair of stress-transmitting appendages 76a, 76b. The stress-transmitting appendage 76a at the wide end of the strain sensing section 74a has a width $w_1$ equal to the width $w_L$ of this end of the strain sensing section 74a. The stress-transmitting appendage 76b at the narrow end of the strain sensing section 74a has a width $W_2$ greater than $w_1$ and $W_L$; the strain sensing section 74a itself has, at this end, a width $w_s$ less than $w_1$ and $w_L$. An optical fiber 10 with an FBG 12 is fastened to the strain sensing section 74a in a curved configuration so that, as in the first embodiment, one end of the FBG 12 is oriented in the X direction, the other end is oriented in the Y direction, and the FBG 12 describes one quarter of a circular arc between these two ends.

Figure 14:
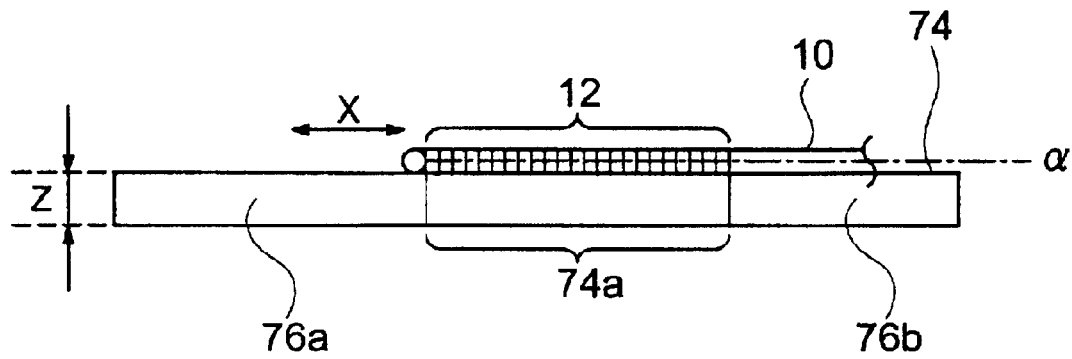
FIG. 14 is a side view of the strain sensor in FIG. 13.

Referring to FIG. 14, the strain sensor member 74 has a uniform thickness (z) Accordingly, when a tension force F is applied to the strain sensor member 74 in the X direction (the longitudinal direction), the strain sensing section 74a elongates unevenly; the narrow end near stress-transmitting appendage 76b elongates more than the wide end near stress-transmitting appendage 76a. This effect is added to the effect of the curvature of the core axis $\alpha$ of the FBG 12.

Figure 15:
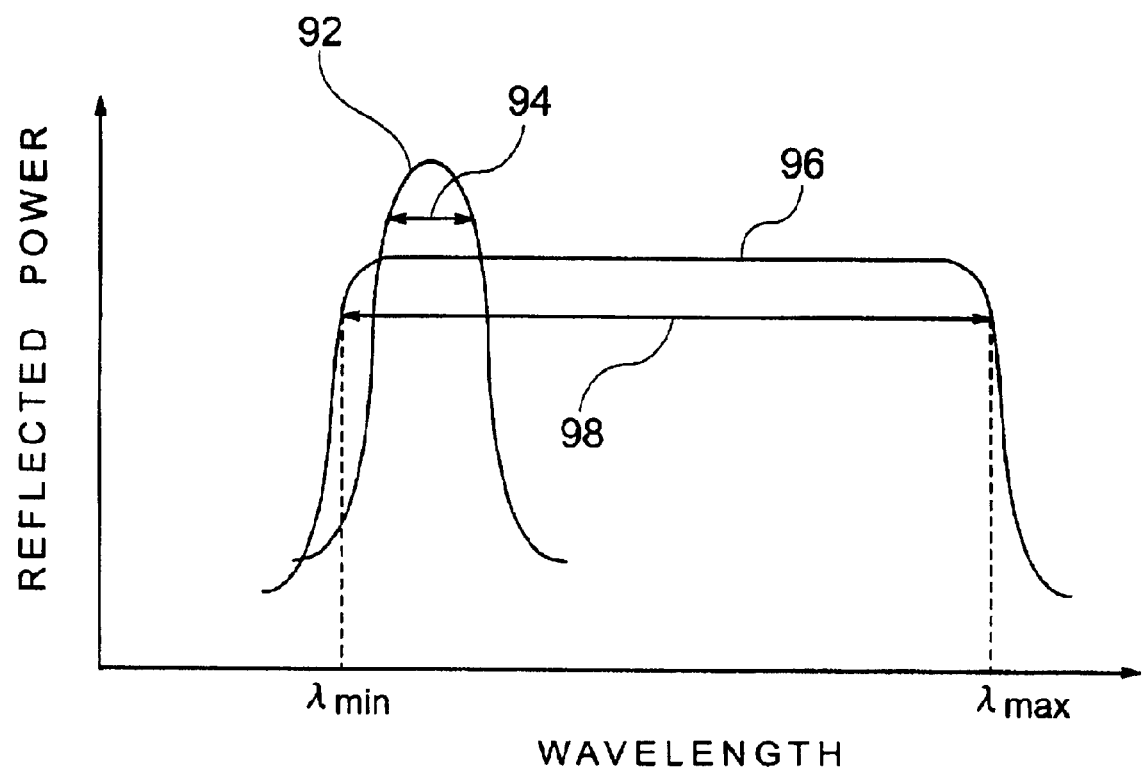
FIG. 15 is a graph illustrating reflection spectra obtained with the strain sensor in FIG. 13.

FIG. 15 shows reflection spectra of the FBG 12 in the second embodiment as measured before and after a certain tension force is applied. Wavelength is indicated on the horizontal axis and reflected optical power on the vertical axis. Reflection spectrum 92, which has a relatively narrow reflection band 94, is obtained before the tension force is applied. Reflection spectrum 96, which has a wider reflection band 98, is obtained after the tension force is applied. This reflection band 98 is wider than the reflection band 38 in the first embodiment, due to the added effect of the taper. The second embodiment accordingly enables strain to be measured with even higher sensitivity than in the first embodiment. As in the first embodiment, strain is measured by measuring the change in the reflection bandwidth, and this change is independent of temperature effects.

Figure 16:
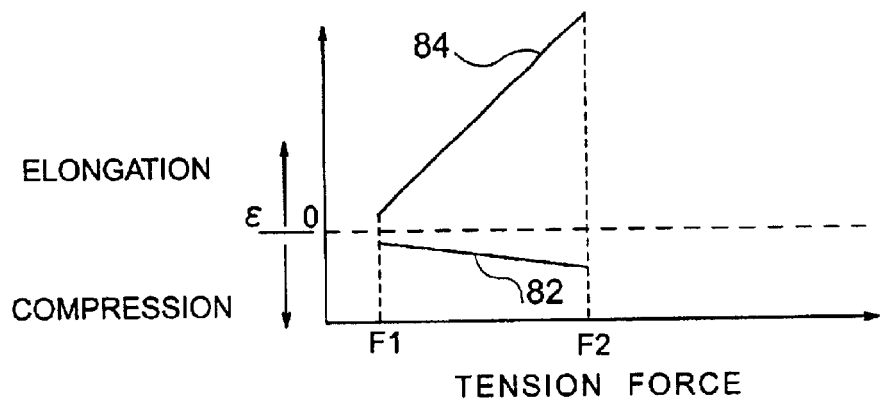
FIG. 16 is a graph illustrating compression and elongation strain in the strain sensor in FIG. 13.

FIG. 16 illustrates the changes in compression strain 82 and elongation strain 84 as an applied tension force increases from $F_1$ to $F_2$ in the second embodiment. Strain $\epsilon$ is indicated on the vertical axis, positive values representing elongation strain and negative values compression strain. The slope of the elongation strain characteristic 84 is greater than in the first embodiment.

Figure 17:
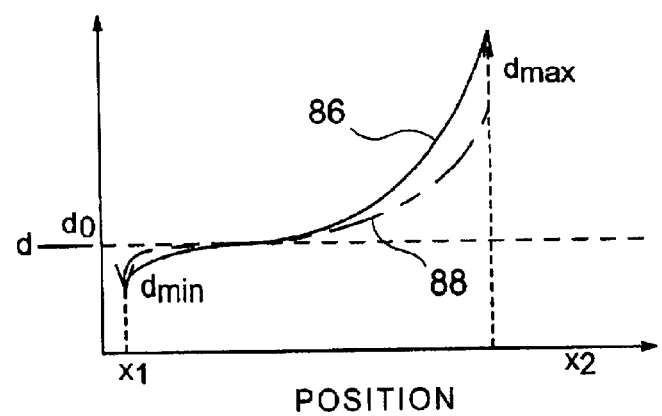
FIG. 17 is a graph illustrating variations in the grating pitch in the strain sensor in FIG. 13.

FIG. 17 indicates variations in the grating pitch d along the core axis $\alpha$ of the optical fiber 10. As in the first embodiment, the coordinates $x_1$ and $x_2$ correspond to the two ends of the FBG 12. The minimum grating pitch $d_{min}$ occurs at the end $x_1$ where the taper of the strain sensing section 74a is widest and the core axis $\alpha$ is oriented in the Y direction. The maximum grating pitch $d_{max}$ occurs at the end $x_2$ where the taper of the strain sensing section 74a is narrowest and the core axis $\alpha$ is oriented in the X direction. The solid characteristic 86 is obtained when a comparatively large tension force is applied; the dash-dot characteristic 88 is obtained when a smaller tension force is applied. For both characteristics, the maximum grating pitch $d_{max}$ is larger than in the first embodiment, indicating that greater chirp is obtained.

Figure 18:
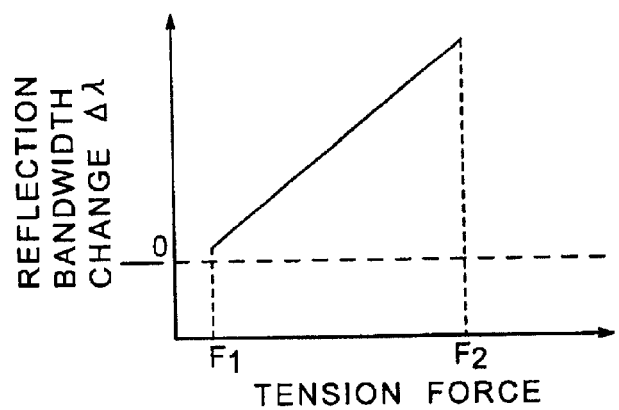
FIG. 18 is a graph illustrating the relation of reflection bandwidth to tension force in the strain sensor in FIG. 13.

FIG. 18 plots the change $\Delta\lambda$ in the reflection bandwidth (the difference between $\lambda_{max}$ and $\lambda_{min}$) as a function of applied tension force F. The slope ($\Delta\lambda/\Delta F$) of the resulting line is greater than in the first embodiment, indicating that the second embodiment provides higher measurement sensitivity.

In one example of the second embodiment, the strain sensor member 74 is a stainless steel plate with a thickness of one hundred micrometers (z=100 $\mu$m) and a Poisson's ratio of 0.293. The width of the strain sensing section 74a in this example varies from sixty millimeters ($w_L$=60 mm) to five millimeters ($w_s$=5 mm). The FBG 12 has a Bragg wavelength of 1.55 $\mu$m, and the half-power width of the reflection bandwidth is 0.2 $\mu$m. The length of the strain sensing section 74a, from one end to the other, is kept within ten millimeters (10 mm), as in the corresponding example of the first embodiment given above. When strain was measured over a range of tension force F from one to twenty kilograms (1–20 kg), the sensitivity in this example of the second embodiment exceeded the sensitivity in the corresponding example of the first embodiment by approximately a factor of five.

Figure 2:
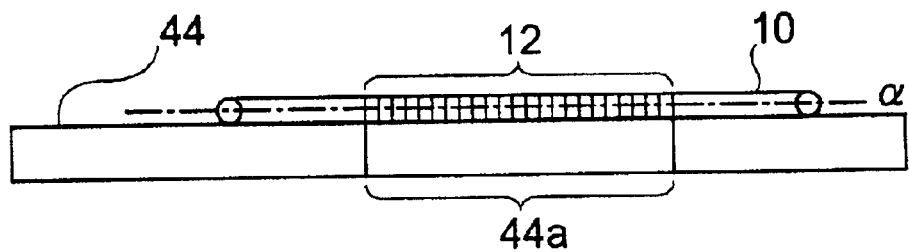
FIG. 2 is a side view of the strain sensor in FIG. 1.
Figure 3:
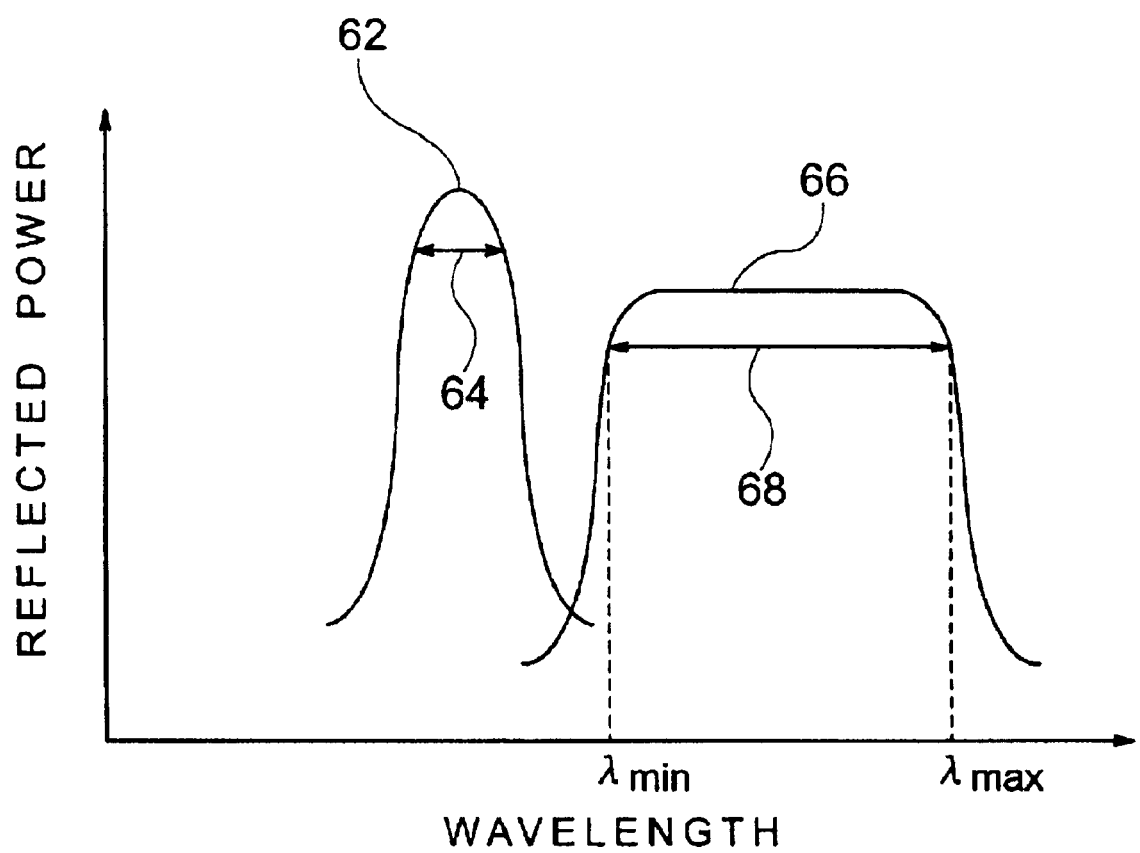
FIG. 3 is a graph illustrating reflection spectra obtained with the strain sensor in FIG. 1.
Figure 4:
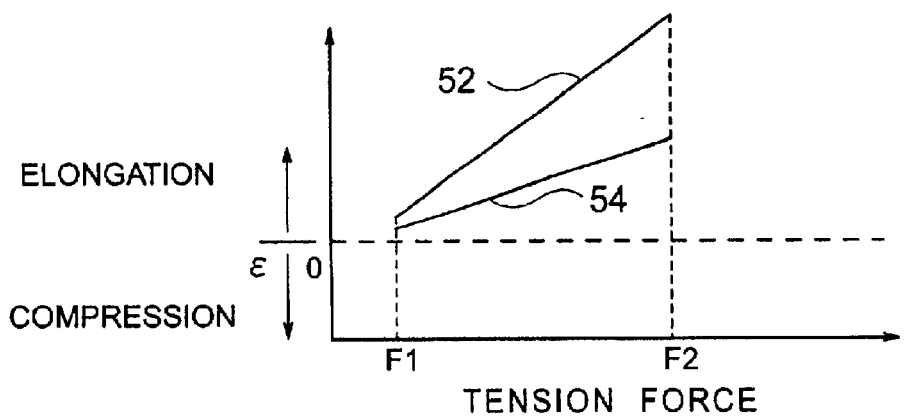
FIG. 4 is a graph illustrating compression and elongation strain in the strain sensor in FIG. 1.
Figure 5:
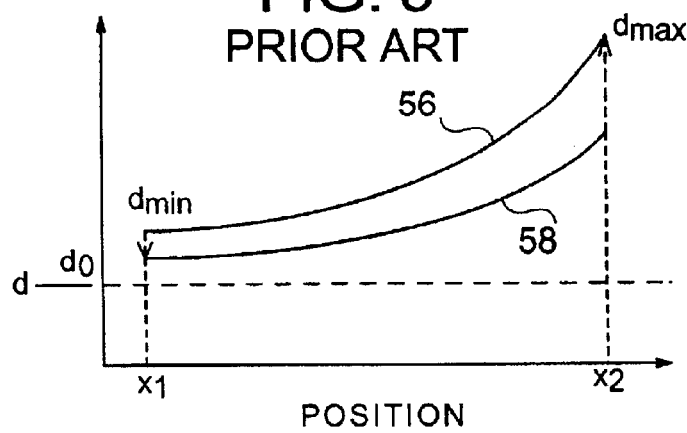
FIG. 5 is a graph illustrating variations in the grating pitch in the strain sensor in FIG. 1.
Figure 6:
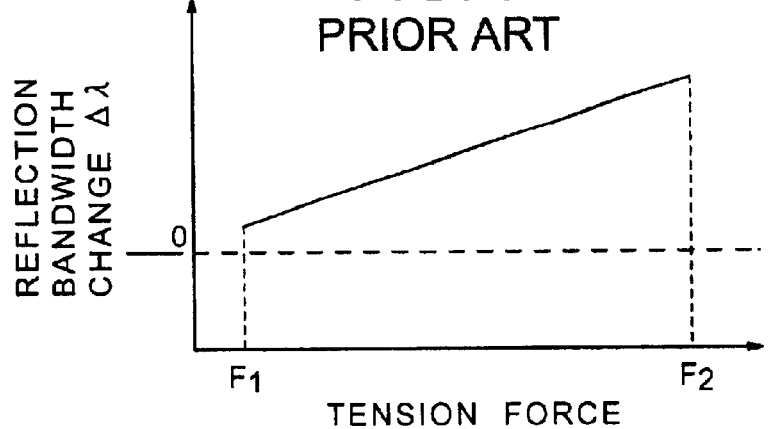
FIG. 6 is a graph illustrating the relation of reflection bandwidth to tension force in the strain sensor in FIG. 1.

Compared with the conventional strain sensor shown in FIG. 1, the curvature of the optical fiber 10 in the second embodiment enables an FBG 12 of the same length of fiber to be accommodated in a shorter taper, so that the degree of taper (the amount of change in width per unit length) can be increased in order to obtain greater sensitivity. In other words, the second embodiment removes some of the geometrical constraints present in the conventional strain sensor.

The dimensions of the strain sensing section 74a in the second embodiment can be varied according to the expected size of the strain to be measured.

The invented strain sensor can also be used to measure compression strain by pre-tensioning the strain sensing section and measuring the reduction in the reflection bandwidth when a compression force is applied.

Those skilled in the art will recognize that further variations are possible within the scope claimed below.

What is claimed is:

1. A fiber Bragg grating strain sensor comprising:
   a strain sensor member having a strain sensing section for receiving stress in a longitudinal direction; and
   a fiber Bragg grating fastened to said strain sensor member within said strain sensing section, said fiber Bragg grating having a first end oriented in the longitudinal direction, a second end oriented in a lateral direction perpendicular to the longitudinal direction, and a fiber axis forming one quarter of a circular arc between the first end and the second end.

2. The fiber Bragg grating strain sensor of claim 1, wherein said strain sensor member has a form of a plate of constant thickness, including said strain sensing section as a central section of said plate, and further including a pair of stress-transmitting appendages joined to longitudinally opposite sides of the said strain sensing section, by which the stress is applied to said strain sensing section.

3. The fiber Bragg grating strain sensor of claim 2, wherein said strain sensing section has a constant width in the lateral direction.

4. The fiber Bragg grating strain sensor of claim 3, wherein said stress-transmitting appendages are wider than said strain sensing section in the lateral direction.

5. The fiber Bragg grating strain sensor of claim 4, wherein said stress-transmitting appendages and said strain sensing section form an H shape.

6. The fiber Bragg grating strain sensor of claim 5, wherein said stress-transmitting appendages each have a width which is greater than a width of said strain sensing section.

7. The fiber Bragg grating strain sensor of claim 2, wherein said strain sensing section has a tapered shape.

8. The fiber Bragg grating strain sensor of claim 7, wherein said stress-transmitting appendages are at least as wide, in the lateral direction, as the sides of said strain sensing section to which said stress-transmitting appendages are joined.

9. The fiber Bragg grating strain sensor of claim 8, wherein the width of said strain sensing section decreases continuously from one of the longitudinally opposite sides to another one of the longitudinally opposite sides.

10. The fiber Bragg grating strain sensor of claim 7, wherein one of said stress-transmitting appendages at a wide end of said strain sensing section has a width ($w_1$) equal to a width ($w_L$) of the wide end of said strain sensing section and the other one of said stress-transmitting appendages at a narrow end of said strain sensing section has a width ($w_2$) greater than $w_1$ and $w_L$.

11. The fiber Bragg grating strain sensor of claim 1, wherein the first end and the second end of said fiber Bragg grating are oriented at right angles with respect to one another.

12. The fiber Bragg grating strain sensor of claim 1, wherein when the stress is received in the longitudinal direction of said fiber Bragg grating strain sensor, the first end of said fiber Bragg grating strain sensor becomes elongating and the second end of said fiber Bragg grating strain sensor becomes compressed.

* * * * *